United States Patent
Huang et al.

(10) Patent No.: US 12,399,939 B2
(45) Date of Patent: Aug. 26, 2025

(54) DATA PROCESSING METHOD AND APPARATUS, READABLE STORAGE MEDIUM, AND ELECTRONIC DEVICE

(71) Applicant: Alipay (Hangzhou) Information Technology Co., Ltd., Zhejiang (CN)

(72) Inventors: Ke Huang, Zhejiang (CN); Tao Wang, Zhejiang (CN); Kaiwei Li, Zhejiang (CN); Hongpeng Gao, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/423,743

(22) Filed: Jan. 26, 2024

(65) Prior Publication Data

US 2024/0256613 A1 Aug. 1, 2024

(30) Foreign Application Priority Data

Jan. 29, 2023 (CN) .......................... 202310103165.0

(51) Int. Cl.
*G06F 16/903* (2019.01)
*G06F 16/901* (2019.01)

(52) U.S. Cl.
CPC .... *G06F 16/90335* (2019.01); *G06F 16/9024* (2019.01)

(58) Field of Classification Search
CPC ........................ G06F 16/90335; G06F 16/9024
USPC .................................................. 707/756, 761
See application file for complete search history.

(56) References Cited

U.S. PATENT DOCUMENTS

| 2011/0182479 | A1* | 7/2011 | Sese ..................... G06F 16/9027 |
| | | | 382/113 |
| 2017/0075953 | A1* | 3/2017 | Bozkaya ........... G06F 16/24522 |
| 2018/0067987 | A1* | 3/2018 | Kang .................. G06F 16/2443 |

(Continued)

FOREIGN PATENT DOCUMENTS

| CN | 105144151 A | 12/2015 |
| CN | 110276080 A | 9/2019 |

OTHER PUBLICATIONS

Chinese Search Report issued in corresponding Chinese Application No. 202310103165.0 (1 page), May 24, 2025.

*Primary Examiner* — Baoquoc N To
(74) *Attorney, Agent, or Firm* — Finnegan, Henderson, Farabow, Garrett & Dunner, LLP

(57) ABSTRACT

A data processing method applied to a graph database, includes: determining each to-be-queried object in a received query statement and a screening condition for each to-be-queried object based on the query statement, wherein the to-be-queried object includes at least one of a graph data vertex or a graph data edge in the graph database; generating a target node corresponding to each to-be-queried object, performing semantic analysis on the screening condition for the to-be-queried object, determining a semantic query condition, and determining a sub-node of the target node based on each determined semantic query condition; determining, based on a sub-node of each target node, each database operation corresponding to the target node that needs to be performed by the graph database; and executing a data processing task corresponding to the query statement based on each database operation, and returning an execution result based on the query statement.

20 Claims, 5 Drawing Sheets

(56) References Cited

U.S. PATENT DOCUMENTS

2018/0121482 A1* 5/2018 Heen .................... G06F 16/2358
2019/0146970 A1* 5/2019 Chamieh ........... G06F 16/24524
                                                                                 707/718

* cited by examiner

DATA PROCESSING METHOD AND APPARATUS, READABLE STORAGE MEDIUM, AND ELECTRONIC DEVICE

CROSS-REFERENCE TO RELATED APPLICATIONS

The present application is based upon and claims priority to Chinese Patent Application No. 202310103165.0, filed on Jan. 29, 2023, the entire content of which is incorporated herein by reference.

TECHNICAL FIELD

The present specification relates to the field of computer technologies, and in particular, to a data processing method and apparatus, a readable storage medium, and an electronic device.

BACKGROUND

Currently, with the development of Internet technologies and people's increasing attention to private data, a graph database is increasingly applied to people's lives. However, currently, there is no uniform query language standard when data in the graph database is processed.

SUMMARY

According to a first aspect of the present specification, a data processing method applied to a graph database includes: determining each to-be-queried object in a received query statement and a screening condition for each to-be-queried object based on the query statement, where the to-be-queried object includes at least one of a graph data vertex or a graph data edge in the graph database; generating a target node corresponding to each to-be-queried object, performing semantic analysis on the screening condition for the to-be-queried object, determining a semantic query condition, and determining a sub-node of the target node based on each determined semantic query condition; determining, based on a sub-node of each target node, each database operation corresponding to the target node that needs to be performed by the graph database; and executing a data processing task corresponding to the query statement based on each database operation, and returning an execution result based on the query statement.

According to a second aspect of the present specification, an electronic device includes a processor; and a memory storing instructions executable by the processor. The processor is configured to: determine each to-be-queried object in a received query statement and a screening condition for each to-be-queried object based on the query statement, where the to-be-queried object includes at least one of a graph data vertex or a graph data edge in a graph database; generate a target node corresponding to each to-be-queried object, perform semantic analysis on the screening condition for the to-be-queried object, determine a semantic query condition, and determine a sub-node of the target node based on each determined semantic query condition; determine, based on a sub-node of each target node, each database operation corresponding to the target node that needs to be performed by the graph database; and execute a data processing task corresponding to the query statement based on each database operation, and return an execution result based on the query statement.

According to a third aspect of the present specification, a non-transitory computer-readable storage medium has stored thereon instructions that, when executed by a processor, cause the processor to perform a data processing method applied to a graph database. The method includes: determining each to-be-queried object in a received query statement and a screening condition for each to-be-queried object based on the query statement, where the to-be-queried object includes at least one of a graph data vertex or a graph data edge in the graph database; generating a target node corresponding to each to-be-queried object, performing semantic analysis on the screening condition for the to-be-queried object, determining a semantic query condition, and determining a sub-node of the target node based on each determined semantic query condition; determining, based on a sub-node of each target node, each database operation corresponding to the target node that needs to be performed by the graph database; and executing a data processing task corresponding to the query statement based on each database operation, and returning an execution result based on the query statement.

In embodiments of the present specification, the screening condition for each to-be-queried object in the query statement is extracted, and semantic analysis is performed on the screening condition, to determine a semantic query condition that can take semantic meanings of a plurality of query statements into account. As a result, a database operation is accurately determined. Even if query statements corresponding to different query language types are received, an execution result corresponding to each query statement can be determined, and therefore data processing efficiency is improved for the graph database.

BRIEF DESCRIPTION OF DRAWINGS

The accompanying drawings are provided for further understanding of the present specification and form a part of the present specification. Example embodiments are described in the present specification, and do not constitute an improper limitation on the present specification. In the drawings.

DETAILED DESCRIPTION

Reference will now be made in detail to example embodiments, which are some rather than all of the embodiments of the present specification. Other embodiments obtained by persons of ordinary skill in the art based on the embodiments of the present specification may also fall within the protection scope of the present specification.

In recent years, as the graph computing technology gradually becomes mature and the Internet technology develops, a graph database is increasingly used in various fields of people's lives, such as a financial field, a medical field, and a security field. The graph database is a type of non-relational graph database. Compared with a relational database, the graph database is different from the relational database in terms of data storage, query, and a data structure in that data in the graph database needs to be queried based on a query statement.

Because the graph database is developed at later time, there is no uniform query language standard when data in the graph database is queried. In other words, there is no common query language to query the data in the graph database. Consequently, various types of query languages are currently used to query the data in the graph database. For each type of query language, to ensure query efficiency and accuracy when the data in the graph database is queried based on the query language, the graph database is usually correspondingly modified based on a syntax feature of the query language, so that when receiving a query statement of this type, the graph database can execute the query statement and obtain an accurate result.

However, there is a difference between all types of query languages. Although syntax corresponding to the types of query languages may have a common point, there is also a difference. Therefore, when the above graph database that is modified based on the syntax feature cannot support data processing of another type of query statement or data query based on another type of query statement, an obtained result is not accurate enough.

Embodiments of the present specification provide a data processing method for the graph database to process a query statement and obtain an accurate result regardless of a type of the query statement.

Figure 1:
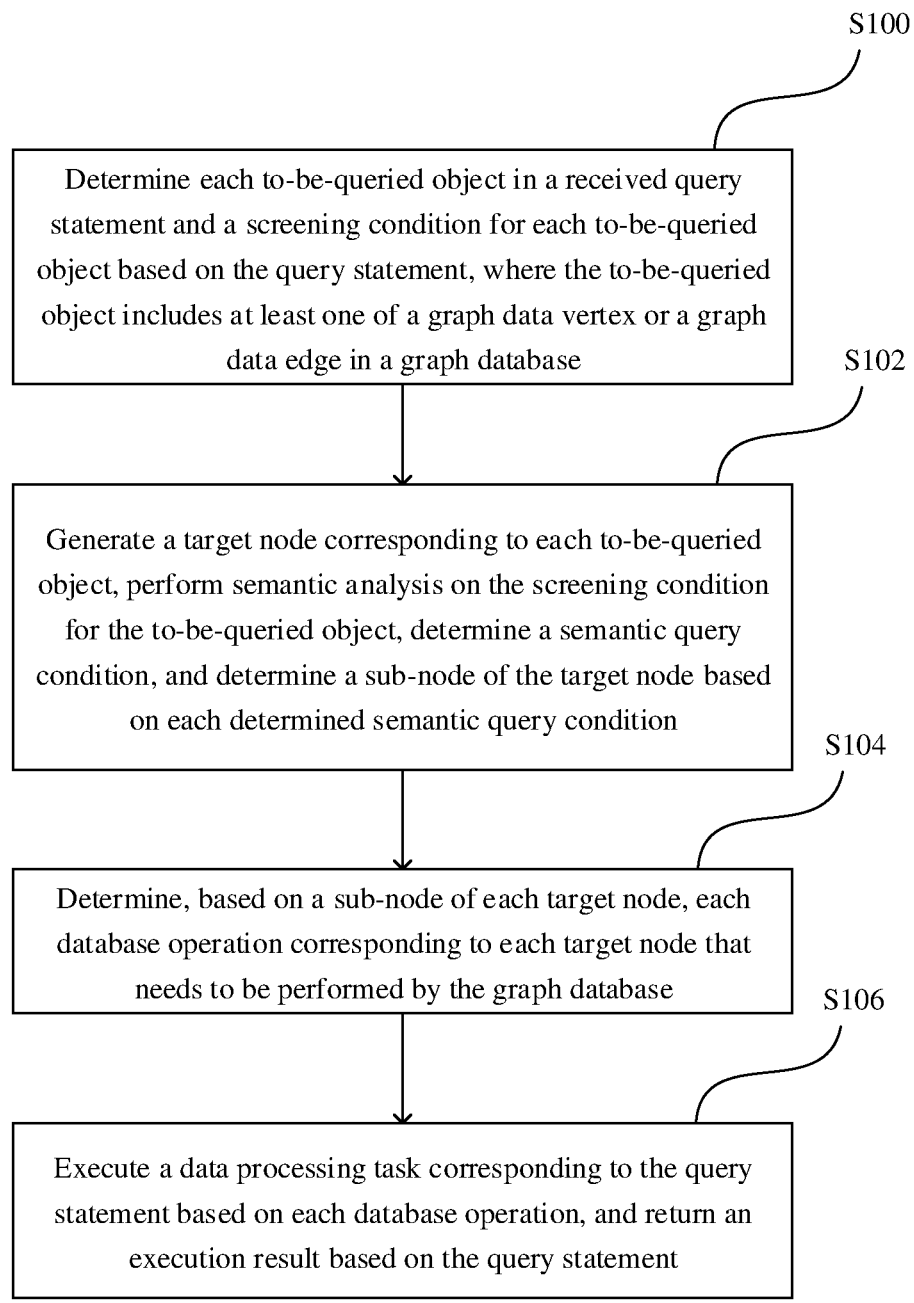
FIG. 1 is a schematic flowchart illustrating a data processing method according to an embodiment of the present specification.

FIG. 1 is a schematic flowchart illustrating a data processing method according to an embodiment of the present specification. The method may include the following steps S100, S102, S104, and S106.

Step S100: Determine each to-be-queried object in a received query statement and a screening condition for each to-be-queried object based on the query statement, where the to-be-queried object includes at least one of a graph data vertex or a graph data edge in a graph database.

Conventionally, when the graph database is queried based on the query statement, the following case may occur: A type of a query statement supported by the graph database is used as a specified type. When the query statement is received, the database determines a query language type corresponding to the query statement. Then, a rule of conversion between a query statement of the query language type and a query statement of the specified type is determined, and based on this conversion rule, the database translates the received query statement into the query statement of the specified type. Finally, processing is performed based on a translation result to obtain a processing result, and the processing result is used as a processing result of the received query statement.

However, as noted above, there is a difference between syntax corresponding to query languages of different types. Therefore, in a process of translating a query statement of one query language type into another query language type, there is certain loss in corresponding description information, and consequently, accuracy of an execution result corresponding to the translated query language is low when data processing is performed based on the translated query language.

Different from the above case, in embodiments of the present specification, after a query statement is received, a to-be-queried object included in the query statement can be determined, and a screening condition corresponding to each to-be-queried object is determined based on the query statement. Semantic analysis is further performed on the screening condition, and a semantic query condition is determined to generate a target node corresponding to each to-be-queried object and a sub-node of the target node. A database operation that needs to be performed by the graph database is determined based on each target node and a sub-node of each target node, and finally, a data processing task corresponding to the query statement is executed based on each determined database operation to return an execution result.

In the embodiments of the present specification, the screening condition for each to-be-queried object in the query statement is extracted, and semantic analysis is performed on the screening condition, to determine a semantic query condition that can take semantic meanings of a plurality of query statements into account, so that a database operation that needs to be performed for the query statement is accurately determined. Even if query statements corresponding to different query language types are received, an execution result corresponding to each query statement can be determined, and therefore data processing efficiency is improved.

The data processing method provided in the present specification can be applied to a scenario in which the graph database queries and processes, based on a received query statement, data stored in the graph database. The data processing method can also be applied to a scenario in which a server determines a corresponding database operation based on a received query statement, and then sends a semantic tree to the graph database, and the graph database performs the determined database operation and returns an execution result to the server. For ease of description, only the graph database is used as an example below to perform the data processing method provided in the present specification.

For example, the graph database can receive a query statement sent by another device, which can be an electronic device such as a server, a terminal, or an intelligent device. A type of the electronic device corresponding to a sender of the query statement can be set as required, and is not limited in the present specification.

For a database, executing a data processing task corresponding to a query statement is to perform operations such as "add", "delete", "modify", and "query" on data stored in the database. An object to be operated needs to be found for all other operations except the "add" operation. For the "add" operation, if a new object needs to be added, a location allocated to a to-be-"added" object needs to be found. If a certain property of a certain object needs to be added, the object needs to be found. Accordingly, a to-be-queried object and a screening condition for the to-be-queried object may be included in the query statement.

The object can be data stored in the database. A key-value pair database is used as an example. An object in the key-value pair database can be a key, a value, or a key-value pair. The graph database is used as an example. An object in the graph database can be a graph data edge, a graph data vertex, a path including a graph data edge and a graph data vertex, etc.

Accordingly, in the embodiment, after the query statement is received, the graph database can determine a to-be-queried object in the query statement and a screening condition for the to-be-queried object based on a predetermined to-be-queried object and the query statement. Subsequent steps are performed based on each determined to-be-queried object and a screening condition corresponding to each to-be-queried object.

In an embodiment, the graph database can also specify in advance that the to-be-queried object can include only a graph data vertex or a graph data edge. A specific to-be-queried object that can be included by the query statement can be set as required, and is not limited in the present specification.

A graph query statement Match(n:Object{name:"oc"}) is used as an example, where match( ) represents searching, n represents vertex data, and Object is a type. The graph database can determine, based on a type of the predetermined to-be-queried object and the query statement, that a to-be-queried object corresponding to the above graph query statement is a graph data vertex. In addition, a to-be-performed operation corresponding to the query statement is "query", and a screening condition corresponding to the graph data vertex can be "Object{name:"oc"}".

Step S102: Generate a target node corresponding to each to-be-queried object, perform semantic analysis on the screening condition for the to-be-queried object, determine a semantic query condition, and determine a sub-node of the target node based on each determined semantic query condition.

In embodiments of the present specification, after a screening condition corresponding to each to-be-queried object is determined, semantic analysis is performed on each screening condition to obtain a semantic query condition that can be used to represent semantic meanings corresponding to a plurality of query language types. Subsequently, a data processing task corresponding to the query statement can be executed based on the semantic query condition, thereby ensuring data processing efficiency.

For one to-be-queried object, the to-be-queried object may include a plurality of screening conditions. If the screening condition is directly used to describe the to-be-queried object, a case in which the to-be-queried object cannot be appropriately represented may occur. If the semantic query condition is directly used to describe the to-be-queried object, the following case may occur: when a database operation corresponding to the to-be-queried object is subsequently determined based on a semantic screening condition, syntax conversion needs to be performed or the semantic screening condition needs to be split first before determining the database operation for the to-be-queried object.

Based on the above, the graph database can generate a target node corresponding to each to-be-queried object. The target node can be used to represent only the to-be-queried object. Then, the graph database can perform semantic analysis on the screening condition for the to-be-queried object to obtain a semantic query condition.

The graph query statement Match(n:Object{name:"oc"}) is used as an example, where match( ) represents searching, n represents vertex data, and Object is a type. It is assumed that a screening condition corresponding to the graph data vertex is "Object{name:"oc"}". The graph database can perform semantic analysis on the screening condition, and determine a semantic meaning corresponding to the query statement to find a graph data vertex whose name is oc and whose type is Object. Accordingly, a semantic screening condition corresponding to the graph data vertex is: A name is "oc", and a type is Object.

Finally, the graph database can determine a sub-node of the target node based on each determined semantic query condition. In other words, each semantic query condition is represented in a form of the sub-node of the target node. The to-be-queried object can be accurately represented based on each determined sub-node. When a database operation that needs to be performed by the graph database is determined based on the sub-node, because one sub-node corresponds to one type of screening condition, the graph database does not need to further split the semantic query condition, as illustrated in FIG. 2.

Figure 2:
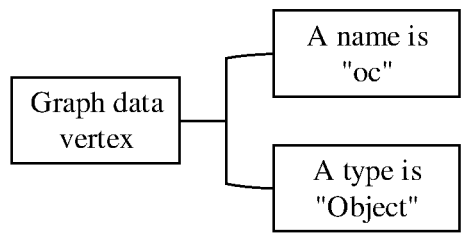
FIG. 2 is a schematic diagram illustrating a structure of a target node and a corresponding sub-node according to an embodiment of the present specification.

FIG. 2 is a schematic diagram illustrating a structure of a target node and a corresponding sub-node according to an embodiment of the present specification. In FIG. 2, the above graph query statement Match(n:Object{name:"oc"}) is used as an example. It is determined that the to-be-queried object is a graph data vertex, and a semantic screening condition corresponding to the graph data vertex is: A name is "oc", and a type is Object. Then, a sub-node of a target node corresponding to the graph data vertex is determined based on the semantic screening condition.

The screening condition, the semantic query condition, and the structure illustrated in FIG. 2 are merely example descriptions. The screening condition can also be represented in a form of a tree, the semantic query condition can also be represented in a form of an expression, and a structure between the target node and the sub-node can also be in a form of a binary tree, a ternary tree, and an n-nary tree. Specific forms of the screening condition and the semantic query condition and a structure between the target node and the sub-node can be set as required, and are not limited in the present specification.

Step S104: Determine, based on a sub-node of each target node, each database operation corresponding to each target node that needs to be performed by the graph database.

In embodiments of the present specification, generally, the graph database can determine a database operation corresponding to the query statement based on the query statement, and then perform the determined graph database operation to complete an execution process of a data processing task corresponding to the query statement. Based on this, the graph database can determine the database operation.

For example, the graph database is a database that performs a query by using a graphical model, and identifies and stores data in a manner such as a node, an edge, or a property. The graph data vertex is a node in the graph database. For example, the node in the graph database is a word or a paragraph of a plurality of discrete ID types such as a product, a user, a product holder, and a property of a product. Nodes of the above types can be queried in embodiments of the present specification. In other words, a graph data vertex and property information corresponding to each graph data vertex can be pre-stored in the graph database. Similarly, the graph database currently can also store a graph data edge and property information corresponding to each graph data edge.

Accordingly, the graph database can determine a type of each to-be-queried object based on a target node of the to-be-queried object.

Then, the graph database can determine, based on a sub-node of the target node and the type of the to-be-queried object, a database operation that needs to be performed when the graph database queries the to-be-queried object. Subsequently, the graph database can perform the determined database operation.

For example, the to-be-queried object is a graph data vertex. The graph database can determine, based on the target node corresponding to the to-be-queried object, that the type of the to-be-queried object is a graph data vertex. The graph database can determine to query the to-be-queried object from each pre-stored graph data vertex and property information of the graph data vertex. It is assumed that a semantic screening condition corresponding to the sub-node of the target node of the to-be-queried object is: A name is "oc", and a type is Object. The graph database can determine that a corresponding database operation is as follows: performing a query in each pre-stored graph data vertex and property information of the graph data vertex based on a name of each node to find graph data vertices whose names are "oc", and then performing, based on a type, a query in the graph data vertices whose names are "oc" to obtain a graph data vertex whose type is Object and whose name is "oc".

In an embodiment, a form of the above database operation can also be n→name→oc→type→Object, where n represents that the type of the to-be-queried object is a graph data vertex, name represents performing searching based on a name, oc represents a name of the to-be-queried object, type represents performing searching based on a type, and Object represents the type of the to-be-queried object. The above expression can be used to represent each database operation corresponding to the to-be-queried object.

The sequence of operations performed by the graph database is merely example description, and a specific execution sequence of the operations can be set as required, and is not limited in the present specification.

Step S106: Execute a data processing task corresponding to the query statement based on each database operation, and return an execution result based on the query statement.

In embodiments of the present specification, after the database operation is determined, the graph database can perform each database operation to execute the data processing task corresponding to the query statement.

For example, the graph database can directly perform the database operation determined in step S104 to determine the to-be-queried object.

In addition to the "query" operation, in execution processes of query statements corresponding to the "add" operation, the "delete" operation, and the "modify" operation, data further needs to be processed. Therefore, the graph database further needs to determine, based on a processing manner corresponding to each to-be-queried object in the query statement, a database operation performed during processing of each to-be-queried object, and process each to-be-queried object based on the determined database operation.

In addition, in execution processes of query statements corresponding to the "add" operation, the "delete" operation, and the "modify" operation, data in the graph database is modified. Therefore, after data processing is completed, the graph database can further update the data in the graph database based on a processing result.

Finally, after the data processing task is executed, the graph database can determine an execution result, and return the execution result based on each to-be-queried statement to complete an execution process corresponding to the query statement.

In the above process, the graph database determines and performs, based on the query statement, the database operation. That process performed during processing of each to-be-queried object can also be performed in step S104. In other words, after a database operation required during query of each to-be-queried object is determined, the database operation during processing of each to-be-queried object is determined based on the query statement, and a database operation corresponding to each to-be-queried object is updated to determine a database operation that includes not only a query process but also a processing process. How to determine the database operation and when to perform setting as required are not limited in the present specification.

Based on the data processing method shown in FIG. 1, after a query statement is received, a to-be-queried object included in the query statement is determined, and a screening condition corresponding to each to-be-queried object is determined based on the query statement. Semantic analysis is further performed on the screening condition, and a semantic query condition is determined to generate a target node corresponding to each to-be-queried object and a sub-node of the target node. A database operation that needs to be performed by the graph database is determined based on each target node and a sub-node of each target node, and finally, a data processing task corresponding to the query statement is executed based on each determined database operation to return an execution result.

In the above method, the screening condition for each to-be-queried object in the query statement is extracted, and semantic analysis is performed on the screening condition, to determine a semantic query condition that can take semantic meanings of a plurality of query statements into account, so that a database operation corresponding to the query statement is accurately determined. Even if query statements corresponding to different query language types are received, an execution result corresponding to each query statement can be determined, and therefore data processing efficiency is improved.

In addition, the graph database can execute query statements corresponding to various types of query languages. In other words, the graph database takes various types of query languages into account. Because there is a difference between syntax of various query languages, the graph database needs to perform semantic analysis on the screening condition. A basis for semantic analysis is that the graph database can determine each to-be-queried object and a screening condition for each to-be-queried object. When query languages have different syntax, the graph database needs to determine the to-be-queried object based on a syntax type corresponding to the received query statement. Therefore, in step S100, the graph database can determine syntax information corresponding to the query statement.

For example, the graph database can receive the query statement, and determine a query language type corresponding to the query statement. For example, query statements are Match(n:Object{name:"oc"}) and Match(n:Object where n.name="oc"). The graph database can receive the above query statements, determine that a query language corresponding to Match(n:Object{name:"oc"}) is an OpenCypher query language, and determine that a query language corresponding to Match(n:Object where n.name="oc") is a Gremlin query language. Both the OpenCypher query language and the Gremlin query language are types of graph query language.

The graph database can also determine syntax information corresponding to the query statement based on the query language type. The syntax information can be a sentence pattern corresponding to "add", "delete", "modify", and "query" operations in the query statement, or can be a representation of information such as a name or a type, or can be a representation of a pre-specified type of the to-be-queried object. Specific content included in the syntax information can be set as required, and is not limited in the present specification.

For example, the above query statement is Match(n: Object{name:"oc"}). The graph database can determine syntax information corresponding to the OpenCypher query language as syntax information of the query statement Match(n: Object{name:"oc"}).

Then, the graph database can determine the to-be-queried object in the query statement and description information of each to-be-queried object based on the determined syntax information.

For example, the above query statement is Match(n: Object{name:"oc"}). The graph database can determine, based on the syntax information of the query statement, that the to-be-queried object in the query statement is n used to represent vertex data, that is, the to-be-queried object is a graph data vertex. In addition, the graph database can determine that the description information of the to-be-queried object is Object {name:"oc" }.

Finally, the graph database can determine a screening condition for each to-be-queried object based on the description information of the to-be-queried object. The graph database can directly use the description information of the to-be-queried object as the screening condition for the to-be-queried object, or can analyze the determined description information of the to-be-queried object and use an analysis result as the screening condition for the to-be-queried object. For example, an abstract syntax tree of the to-be-queried object is determined based on the description information of the to-be-queried object, and then the determined abstract syntax tree is used as the screening condition for the to-be-queried object.

Further, because the to-be-queried object can include at least one of a graph data vertex or a graph data edge, a screening condition for the graph data vertex and a screening condition for the graph data edge in the query statement are usually different. Therefore, in step S102, the graph database can separately perform semantic analysis on the graph data vertex and the graph data edge.

In an embodiment, during query of the graph data vertex, a screening condition corresponding to the graph data vertex may include three types: a name, a type, and a description. The name is a name of the graph data vertex, the type is a type of the graph data vertex, and the description is a specific description of the graph data vertex included in the to-be-queried object. For example, the name of the graph data vertex is A, the type of the graph data vertex is object, and the description corresponding to the graph data vertex is that a length of a character string is greater than 2. A specific type of the screening condition corresponding to the graph data vertex and a specific quantity of screening conditions corresponding to the graph data vertex can be set as required, and are not limited in the present specification.

Accordingly, when determining that the to-be-queried object includes the graph data vertex, the graph database can determine a name, a type, and a description of the to-be-queried object based on a semantic query condition for the graph data vertex. The graph database can determine a name node, a type node, and a description node based on the name, the type, and the description of the to-be-queried object, and use the determined name node, type node, and description node as sub-nodes of the target node of the to-be-queried object.

Because a type, a quantity, etc. of the screening condition included in the query statement are determined by a device that sends the query statement, when determining the semantic query condition for the graph data vertex and determining the sub-node of the target node based on the semantic query condition, at least one semantic query condition and at least one sub-node can be determined for the query statement. A specific semantic query condition and a specific quantity of sub-nodes can be set as required, and are not limited in the present specification.

The graph data vertex includes at least one of a graph data vertex or a graph data end point.

In an embodiment, when the graph data edge is queried, a screening condition corresponding to the graph data edge may include four types: a name, a type, a direction, and a description. The name is a name of the graph data edge, the type is a type of the graph data edge, the direction is a direction of the graph data edge, and the description is a specific description of the graph data edge included in the to-be-queried object. For example, the name of the graph data edge is B, the type of the graph data edge is object, the direction of the graph data edge is from left to right, and a description condition corresponding to the graph data edge is "including a flag C". A type of the screening condition corresponding to the graph data edge and a quantity of screening conditions corresponding to the graph data edge can be set as required, and are not limited in the present specification.

Accordingly, when determining that the to-be-queried object includes the graph data edge, the graph database can determine a name, a type, a direction, and a description of the to-be-queried object based on a semantic query condition for the graph data edge. The graph database can determine a name node, a type node, a direction node, and a description node based on the name, the type, the direction, and the description of the to-be-queried object, and use the determined name node, type node, direction node, and description node as sub-nodes of the target node of the to-be-queried object.

Similarly, because a type of a screening condition included in the query statement and a quantity of screening conditions included in the query statement are determined by the device that sends the query statement, at least one semantic query condition and at least one sub-node can be determined for the query statement when the semantic query condition for the graph data edge is determined and a sub-node of the target node is determined based on the semantic query condition. A specific semantic query condition and a specific quantity of sub-nodes can be set as required, and are not limited in the present specification.

Further, the database can simultaneously process a plurality of query statements. To avoid a case in which the database processes a query operation on a to-be-queried object B in a query statement A as a query operation on a to-be-queried object D in a query statement C, a semantic tree can be further used to represent a target node of each to-be-queried object and a sub-node of each target node, as illustrated in FIG. 3.

Figure 3:
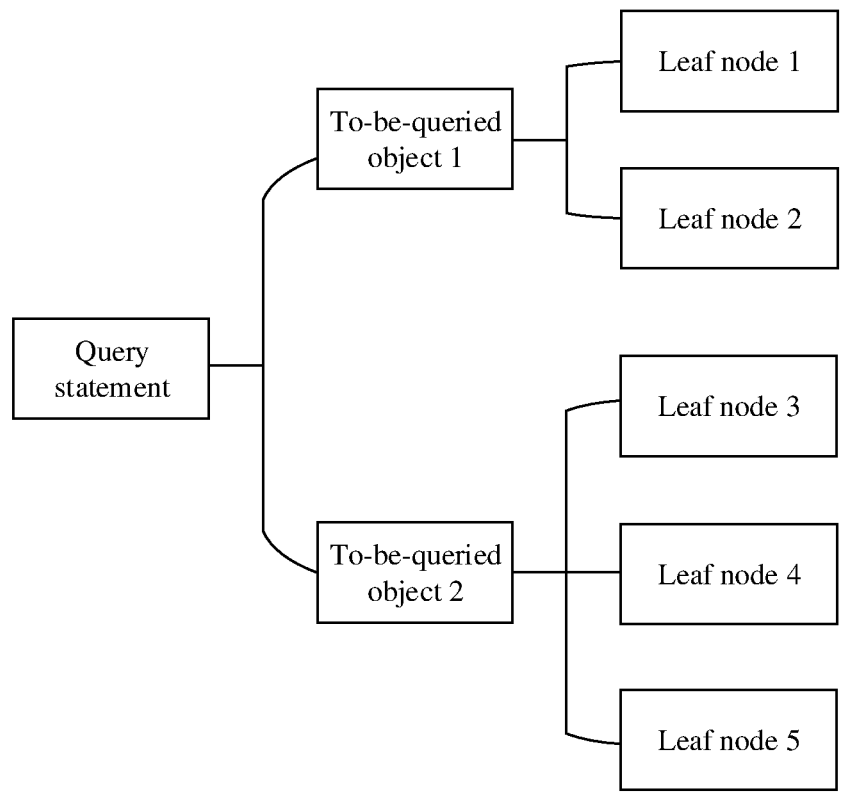
FIG. 3 is a schematic diagram illustrating a structure of a framework of a semantic tree according to an embodiment of the present specification.

FIG. 3 is a schematic diagram illustrating a structure of a semantic tree according to an embodiment of the present specification. In FIG. 3, the query statement includes two to-be-queried objects: a to-be-queried object 1 and a to-be-queried object 2. Sub-nodes corresponding to the to-be-queried object 1 are a leaf node 1 and a leaf node 2, and sub-nodes corresponding to the to-be-queried object 2 are a leaf node 3, a leaf node 4, and a leaf node 5. FIG. 3 is only an example description of a framework of the semantic tree.

A structure corresponding to the framework of the semantic tree can be set as required, and is not limited in the present specification.

In embodiments of the present specification, an execution plan corresponding to the graph database can be determined based on the semantic tree used to ensure the query statement. The graph database can directly determine the semantic tree when determining a target node corresponding to each to-be-queried object and a sub-node corresponding to each target node. In the graph database, target nodes corresponding to a same query statement and sub-nodes of the target nodes can be represented by using a same semantic tree, thereby avoiding the above case of an execution error and ensuring data processing accuracy.

In addition, the target node of the to-be-queried object can be an intermediate node on the semantic tree, and the target node can be a leaf node on the semantic tree. Therefore, during determining of the semantic tree, the graph database can determine a subtree of a target node corresponding to each to-be-queried object, and then construct the semantic tree based on the subtree corresponding to each to-be-queried object.

For example, the graph database can determine a subtree of a target node corresponding to the graph data vertex based on a name query condition for the graph data vertex, a type query condition for the graph data vertex, and a description query condition for the graph data vertex.

In addition, the graph database can determine a subtree of a target node corresponding to the graph data edge based on a name query condition for the graph data edge, a type query condition for the graph data edge, a direction query condition for the graph data edge, and a description query condition for the graph data edge.

Finally, the semantic tree corresponding to the query statement is generated based on the determined subtree corresponding to each to-be-queried object.

In an embodiment, the query statement can further include a description of a query result. In other words, after the query result is determined, the graph database can further screen the query result based on a screening condition corresponding to the query result, and process a screening result as a final query result. Therefore, the graph database can further determine a database operation based on the screening condition corresponding to the query result.

In an embodiment, the graph database can determine the screening condition for the query result from the query statement. For example, the query result is a character string type, and a value of the query result is greater than 7.

In an embodiment, the graph database can also determine a target node corresponding to the query result, and perform semantic analysis on the screening condition for the query result to obtain a semantic query condition corresponding to the query result.

In an embodiment, the graph database can further determine a result constraint node based on the determined semantic query condition, and use the result constraint node as a sub-node of the target node corresponding to the query result.

In an embodiment, the graph database can additionally update, based on the target node corresponding to the query result and the result constraint node, each database operation that needs to be performed by the graph database. In other words, the database operation corresponding to the query result is added into an original database operation.

In an embodiment, the graph database can also update the semantic tree corresponding to the query statement based on the target node corresponding to the query result and a result constraint node. Then, the database operation that needs to be performed by the graph database is redetermined based on the updated semantic tree.

In addition, when generating the semantic tree, the graph database can arrange subtrees of target nodes corresponding to to-be-queried objects to generate the semantic tree. Alternatively, query rankings corresponding to to-be-queried objects can be predetermined in the graph database. For example, the graph data vertex is queried first, the graph data edge is queried then, and the graph data end point is finally queried. Then, the subtrees are arranged based on the query rankings corresponding to the to-be-queried objects, to determine the semantic tree corresponding to the query statement.

The to-be-queried object 1 and the to-be-queried object 2 in FIG. 3 are used as an example. If a query ranking of the to-be-queried object 2 is higher than that of the to-be-queried object 1, an upper branch can be set to a branch of the to-be-queried object 2, and a branch corresponding to the to-be-queried object 1 is set to a lower branch. Alternatively, a branch corresponding to the to-be-queried object 1 is set to a part of a branch of the to-be-queried object 2.

How to obtain the semantic tree corresponding to the graph database can be set as required, and is not limited in the present specification.

As described above, after the semantic tree corresponding to the query statement is determined, the graph database can query, based on the determined semantic tree, each piece of data stored in the graph database, to implement precise processing based on the semantic tree.

Based on this, after the semantic tree corresponding to the query statement is determined, the graph database can execute a data processing task corresponding to the query statement based on the semantic tree.

In an embodiment, the graph database can execute the data processing task corresponding to the query statement based on the semantic tree of the query statement. The data processing task can be a task corresponding to a processing operation such as "adding, deleting, changing, or querying" the data stored in the graph database.

In an embodiment, a database operation corresponding to the database can include a logical execution plan or a physical execution plan. The logical execution plan is used to describe data on which the graph database needs to perform a database operation, and the physical execution plan is used to describe how the graph database needs to perform the database operation on the data stored in the graph database.

In an embodiment, the graph database can determine a logical execution plan of the query statement based on a type of the to-be-queried object included in the semantic tree of the query statement, and then determine a physical execution plan based on the sub-node of the target node of each to-be-queried object and the logical execution plan.

The logical execution plan includes a description that is used to describe all steps that need to be performed in the query statement. In other words, the logical execution plan includes a structural graph for executing the query statement. The physical execution plan includes content that is used to describe a specific execution sequence of steps in the query statement, a data type of each piece of to-be-executed data, etc. In other words, the physical execution data includes a specific flowchart of executing the query statement.

It is assumed that the to-be-queried object is a graph data vertex, and a semantic screening condition corresponding to a sub-node of a target node of the to-be-queried object is: a name is "oc", and a type is Object. The graph database can determine that the logical execution plan is as follows: determining the graph data vertex from the graph data vertex and property information corresponding to the graph data vertex, and the physical execution plan is as follows: searching for each graph data vertex whose name is "oc" from the graph data vertex and the property information corresponding to the graph data vertex based on a name, and then querying, based on a type, the graph data vertices whose names are "oc", to find a graph data vertex whose type is Object and whose name is "oc".

In addition, each graph data vertex and property information of each graph data vertex and each graph data edge and property information of each graph data edge that are stored in the graph database can be stored in a form of a table. For example, the graph database can store each graph data vertex and property information of each graph data vertex in a form of a vertex table, and store each graph data edge and property information of each graph data edge in a form of a relationship table. The property information of the graph data vertex includes at least one of a name, a type, a description, etc. of the graph data vertex. The property information of the graph data edge includes at least one of a name, a type, a direction, a description, etc. of the graph data vertex.

Accordingly, when determining the database operation, the graph database can determine, from the vertex table and the relationship table based on a target node corresponding to each to-be-queried object, a target table that needs to be queried for the to-be-queried object, and then determine, based on each sub-node corresponding to the target node, a database operation that needs to be performed when the graph database queries the to-be-queried object.

The property information of the to-be-queried object can correspond to the above semantic query condition. Therefore, semantic analysis is performed on the screening condition for the to-be-queried object, and the graph database can perform semantic analysis on the screening condition based on each predetermined property of the to-be-queried object to determine a semantic query result. A specific type corresponding to predetermined property information of the to-be-queried object can be set as required, and is not limited in the present specification.

Further, after the data processing task corresponding to the query statement is executed, the graph database can return an execution result based on the query statement, where the execution result can be content such as an execution success or an execution failure, or can be a query result corresponding to the query statement. A type corresponding to the execution result and how to determine the type can be set as required, and are not limited in the present specification.

In a process of determining the physical execution plan based on the logical execution plan, the graph database can determine, based on the logical execution plan and the sub-node of the target node of the to-be-queried object, a database operation that needs to be performed by the graph database. Then, determined database operations are sorted to obtain an optimal sequence of the operations, and the operations in the optimal sequence are used as the physical execution plan. The optimal sequence is a sequence with the fewest computing resources or the lowest time complexity in various sequences. How to determine the physical execution plan can be set as required, and is not limited in the present specification.

Further, in the query statement, the description of the query result generally includes not only a screening condition, but the query result can also be described by using a condition such as an aggregation condition or a sorting condition.

Accordingly, the graph database can determine an aggregation condition and a sorting condition corresponding to the query result from the query statement.

The aggregation condition can be a description of how query results are aggregated, for example, summing all the query results, determining a total quantity of the query results, and selecting a maximum value in the query results. The sorting condition can be the following: determining a property corresponding to each query result, selecting a certain property to sort the query results, and outputting a sorting result. For example, assuming that the query result is person, the sorting condition can be: sorting query results in ascending order of ages. Specific content of the aggregation condition and the sorting condition can be set as required, and is not limited in the present specification.

The graph database can determine a result aggregation node of the query result based on the aggregation condition for the query result, and determine a result sorting node of the query result based on the sorting condition for the query result.

Finally, after the result aggregation node and the result sorting node are determined, the graph database can update the semantic tree corresponding to the query statement based on the result aggregation node, the result sorting node, and the above determined result screening node.

The query statement can further include a first screening condition used to indicate whether the query result can be empty. After the query result is determined, the graph database can determine the first screening condition for the query result in the query statement, and determine whether the execution result matches the first screening condition. If the execution result matches the first screening condition, the graph database can return the execution result. If the execution result does not match the first screening condition, the graph database can return prompt information indicating that execution of the query statement fails.

The above first screening condition used to indicate whether the query result can be empty can be further used to constrain the graph data vertex and the graph data edge. When any query result of the graph data vertex and the graph data edge does not match the first screening condition, prompt information used to indicate that execution of the query statement fails is returned based on the query statement. A specific type of data included in the query statement and how to return information based on the query result can be set as required, and are not limited in the present specification.

When the to-be-queried object is a query result, a description of the query result in the query statement includes at least one of a screening condition for the query result, an aggregation condition for the query result, or a sorting condition for the query result. A specific condition used to describe the query result can be set as required, and is not limited in the present specification.

Figure 4:
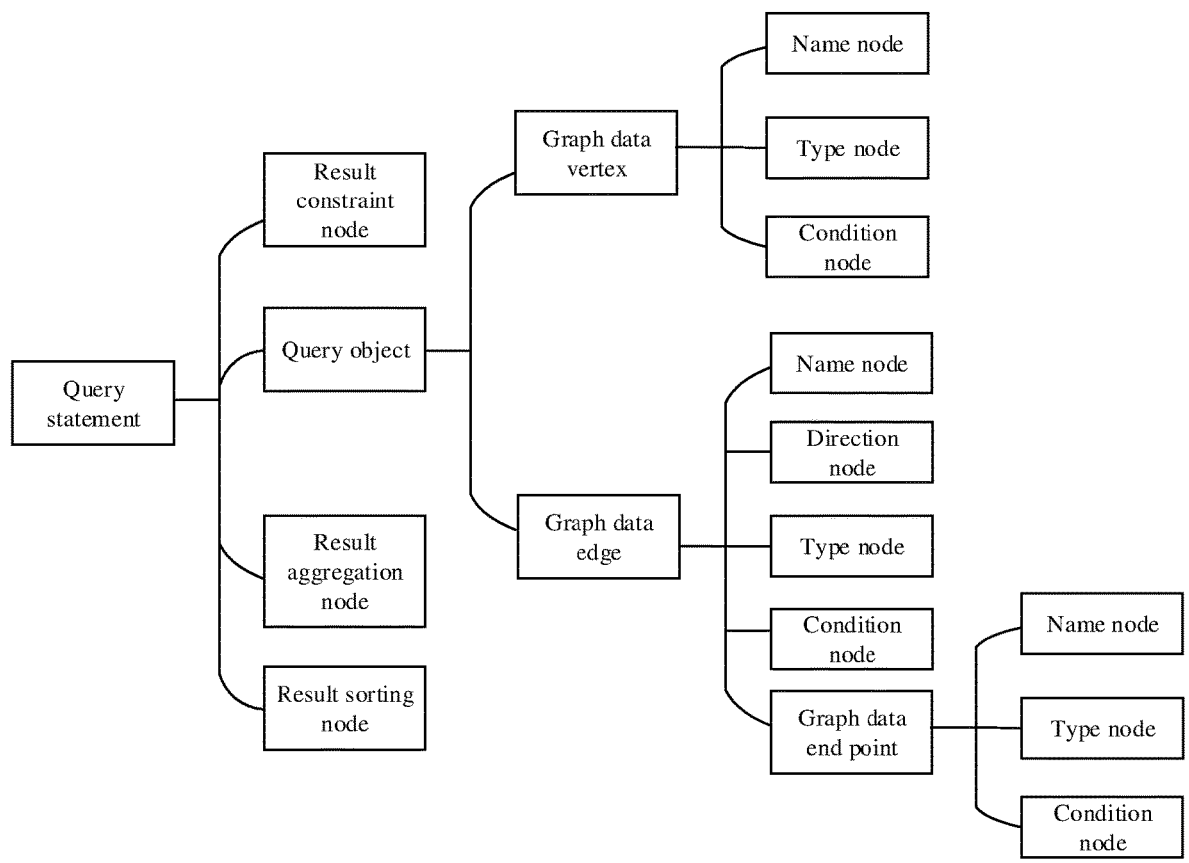
FIG. 4 is a schematic flowchart illustrating a data processing method according to an embodiment of the present specification.

Based on a same idea, the present specification further provides a schematic diagram illustrating a structure of a framework of a semantic tree, as shown in FIG. 4.

FIG. 4 is a schematic diagram illustrating a structure of a semantic tree according to an embodiment of the present specification. In FIG. 4, the graph database determines a subtree of a target node of the graph data vertex, a subtree of a target node of the graph data edge, a subtree of a target node of the graph data end point, and a subtree of a target node of the query result. In this case, the graph database can concatenate the above determined subtrees to obtain the semantic tree shown in FIG. 4. The result constraint node, the result aggregation node, and the result sorting node are sub-nodes of the target node of the query result.

In the above framework of the semantic tree, the graph data start point, the graph data edge, and the graph data end point can be sub-nodes corresponding to a to-be-queried object, or can be used together with a to-be-queried object as sub-nodes corresponding to the query statement. A specific result of the framework of the semantic tree can be set as required, and is not limited in the present specification.

Figure 5:
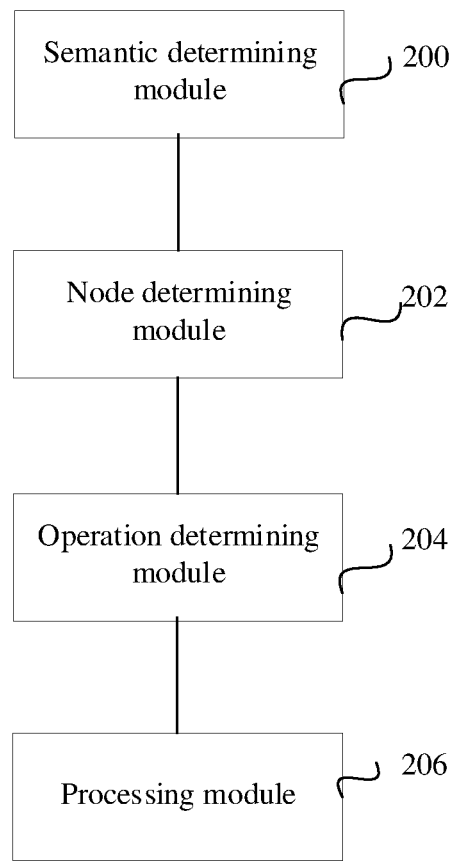
FIG. 5 is a schematic diagram illustrating a data processing apparatus according to an embodiment of the present specification.

FIG. 5 is a schematic diagram of a data processing apparatus according to an embodiment of the present specification. The data processing apparatus is applied to a graph database and includes: a semantic determining module 200, configured to determine each to-be-queried object in a received query statement and a screening condition for each to-be-queried object based on the query statement, where the to-be-queried object includes at least one of a graph data vertex or a graph data edge in the graph database; a node determining module 202, configured to generate a target node corresponding to each to-be-queried object, perform semantic analysis on the screening condition for the to-be-queried object, determine a semantic query condition, and determine a sub-node of the target node based on each determined semantic query condition; an operation determining module 204, configured to determine, based on a sub-node of each target node, each database operation corresponding to each target node that needs to be performed by the graph database; and a processing module 206, configured to execute a data processing task corresponding to the query statement based on each database operation, and return an execution result based on the query statement.

In an embodiment, the semantic determining module 200 is configured to receive the query statement, determine syntax information corresponding to the query statement, determine each to-be-queried object in the query statement and description information of each to-be-queried object based on the syntax information, and use the description information of each to-be-queried object as the screening condition for the to-be-queried object.

In an embodiment, the to-be-queried object includes at least a graph data vertex, the graph data vertex includes at least one of a graph data start point or a graph data end point, and the node determining module 202 is configured to perform semantic analysis on a screening condition for the graph data vertex to determine a name, a type, and a description of the to-be-queried object.

In an embodiment, a name node, a type node, and a description node are determined as sub-nodes of the target node corresponding to the to-be-queried object based on the name, the type, and the description of the to-be-queried object.

In an embodiment, the to-be-queried object includes at least a graph data edge, and the node determining module 202 is configured to perform semantic analysis on a screening condition for the graph data edge, determine a name, a type, a direction, and a description of the to-be-queried object, and determine a name node, a type node, a direction node, and a description node as sub-nodes of the target node corresponding to the to-be-queried object based on the name, the type, the direction, and the description of the to-be-queried object.

In an embodiment, the query statement further includes a screening condition for a query result, and the operation determining module 204 is configured to determine a screening condition corresponding to the query result from the query statement, determine a target node corresponding to the query result, perform semantic analysis on the screening condition for the query result to obtain a semantic query condition corresponding to the query result, determine a result constraint node as a sub-node of the target node corresponding to the query result based on the determined semantic query condition, and update, based on the target node corresponding to the query result and the result constraint node, each database operation that needs to be performed by the graph database.

In an embodiment, the graph database stores a vertex table and a relationship table, the vertex table stores property information of each graph data vertex, and the relationship table stores property information of each graph data edge. The operation determining module 204 is configured to determine, from the vertex table and the relationship table based on a target node corresponding to each to-be-queried object, a target table that needs to be queried for the to-be-queried object, and determine, based on each sub-node corresponding to the target node, a database operation that needs to be performed by the graph database to query the to-be-queried object.

In an embodiment, the query statement includes a screening condition for a query result, the screening condition includes a first screening condition used to indicate whether the query result can be empty, and the processing module 206 is configured to determine a screening condition for the query result in the query statement, determine whether the execution result matches the first screening condition in the screening condition, and if yes, return the execution result, or if no, return prompt information used to indicate that execution of the query statement fails.

Embodiments of the present specification further provide a non-transitory computer-readable storage medium. The storage medium stores a computer program that, when executed by a processor, causes the processor to perform the data processing method described above.

Figure 6:
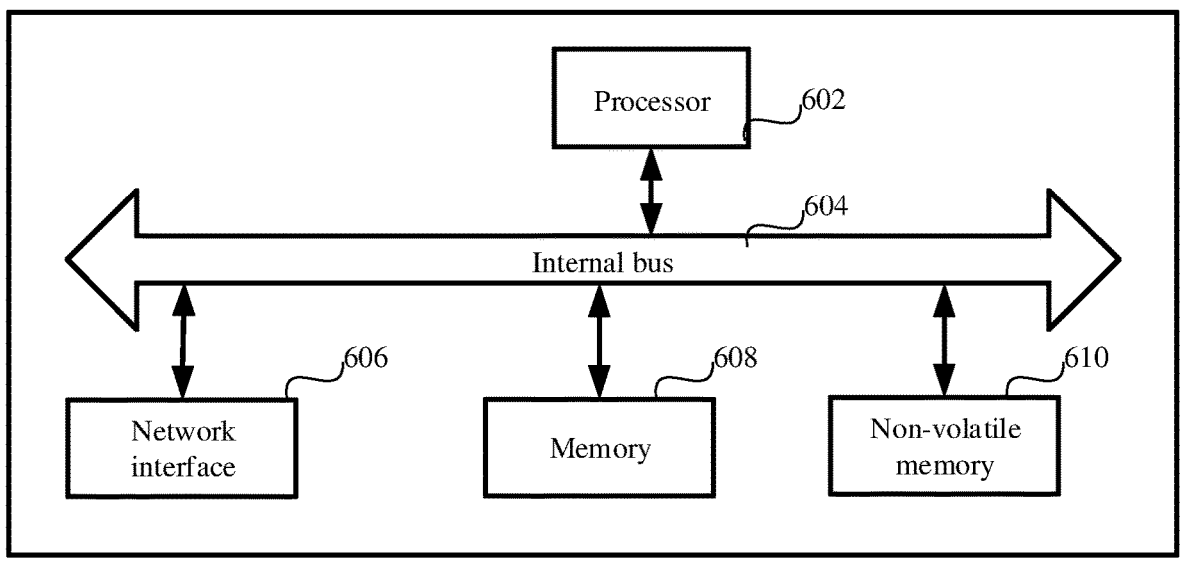
FIG. 6 is a schematic diagram illustrating an electronic device according to an embodiment of the present description.

Embodiments of the present specification further provide an electronic device. FIG. 6 is a schematic diagram illustrating a structure of the electronic device. As shown in FIG. 6, at a hardware level, the electronic device includes a processor 602, an internal bus 604, a network interface 606, a memory 608, and a non-volatile memory 610, and may also include hardware required by another service. The processor 602 executes a computer program to implement the data processing method described above.

The electronic device can be implemented by hardware, software, or a combination of software and hardware. In other words, an execution entity of the processing procedure is not limited to each logic unit, but can also be hardware or a logic device. For example, a programmable logic device (PLD) (for example, a field programmable gate array (FPGA)) is such an integrated circuit, and a logical function of the programmable logic device is determined by a user by programming the device. A digital system is "integrated" on a PLD by a designer without requiring a chip manufacturer to design and manufacture a dedicated integrated circuit chip. In addition, currently, instead of manually manufacturing an integrated circuit chip, such programming is mostly implemented by using "logic compiler (logic compiler)" software. The "logic compiler" software is similar to a software compiler used to develop and write a program. To compile original code, a particular programming language also needs to be used for writing. The language is referred to as a hardware description language (HDL). There are many HDLs, such as the advanced Boolean expression language (ABEL), the Altera hardware description language (AHDL), Confluence, the Cornell University programming language (CUPL), HDCal, the Java hardware description language (JHDL), Lava, Lola, MyHDL, PALASM, and the Ruby hardware description language (RHDL). The very-high-speed integrated circuit hardware description language (VHDL) and Verilog are most commonly used. Those skilled in the art would understand that a hardware circuit for implementing a logical method procedure can be easily obtained by logically programming the method procedure by using a few hardware description languages and programming the method procedure into an integrated circuit.

The electronic device can be implemented by a controller. For example, the controller can use a form such as a micro-processor, a processor, or a computer-readable medium, a logic gate, a switch, an application specific integrated circuit (ASIC), a programmable logic controller, or an embedded micro-controller storing computer-readable program code (such as software or firmware) that can be executed by the (micro-)processor. The controller can also be implemented as a part of control logic of the memory. Persons skilled in the art would understand that, in addition to implementing the controller in a pure computer-readable program code method, logic programming can be performed on method steps to enable the controller to implement the same function in a form of a logic gate, a switch, an application specific integrated circuit, a programmable logic controller, or an embedded micro-controller. Therefore, the controller can be considered as a hardware component, and an apparatus included in the controller for implementing various functions can also be considered as a structure in the hardware component. Alternatively, an apparatus configured to implement various functions can even be considered as both a software module implementing the method and a structure in a hardware component.

Systems, apparatuses, modules, or units that are set forth in the above embodiments can be embodied by a computer chip or an entity or by a product with a specific function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or any combination of these devices.

For ease of description, the above apparatus is described by dividing functions into various units. When the present specification is implemented, a function of each unit can be implemented in one or more pieces of software and/or hardware.

Persons skilled in the art would understand that the embodiments of the present specification can be provided as methods, systems, or computer program products. Therefore, the present specification can use a form of a hardware only embodiment, a software only embodiment, or an embodiment with a combination of software and hardware. Moreover, the present specification can use a form of a computer program product that is implemented on one or more computer-usable storage media (including but not limited to a disk memory, a CD-ROM, an optical memory, etc.) that include computer-usable program code.

The present specification is described with reference to flowcharts and/or block diagrams of a method, a device (system), and a computer program product according to the embodiments of the present specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that instructions executed by the computer or the processor of the another programmable data processing device generate a device for implementing a specific function in one or more processes in the flowcharts and/or in one or more blocks in the block diagrams.

These computer program instructions can be stored in a computer-readable memory that can guide the computer or the another programmable data processing device to work in a specific way, so the instructions stored in the computer-readable memory generate an artifact that includes an instruction apparatus. The instruction apparatus implements a specific function in one or more processes in the flowcharts and/or in one or more blocks in the block diagrams.

These computer program instructions can be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, the computing device includes one or more processors (CPU), an input/output interface, a network interface, and a memory.

The memory may include a non-persistent memory, a random access memory (RAM), a non-volatile memory, and/or another form that are in a computer readable medium, for example, a read-only memory (ROM) or a flash memory (flash RAM). The memory is an example of the computer-readable medium.

The computer-readable medium includes permanent and non-permanent, removable and non-removable media, and can store information by using any method or technology. The information can be a computer-readable instruction, a data structure, a program module, or other data. Examples of a computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device or any other non-transmission media that can be configured to store information that the computing device can access. As described in the present specification, the computer-readable medium does not include transitory computer-readable media (transitory media) such as a modulated data signal and a carrier.

The terms "include", "comprise", or their any other variants are intended to cover a non-exclusive inclusion, so a process, a method, a product, or a device that includes a list of elements not only includes those elements but also includes other elements that are not expressly listed, or further includes elements inherent to such process, method, product, or device. Without more constraints, an element preceded by "includes a . . . " does not preclude the existence of additional identical elements in the process, method, product, or device that includes the element.

Persons skilled in the art would understand that the embodiments of the present specification can be provided as methods, systems, or computer program products. Therefore, the present specification can use a form of a hardware only embodiment, a software only embodiment, or an embodiment with a combination of software and hardware. Moreover, the present specification can use a form of a computer program product that is implemented on one or more computer-usable storage media (including but not limited to a disk memory, a CD-ROM, an optical memory, etc.) that include computer-usable program code.

The present specification can be described in the general context of computer-executable instructions, for example, a program module, executed by a computer. Typically, program modules include routines, programs, objects, components, data structures, etc. that execute specific tasks or implement specific abstract data types. The present specification can be alternatively practiced in distributed computing environments in which tasks are executed by remote processing devices that are connected through a communication network. In the distributed computing environments, the program module can be located in both local and remote computer storage media including storage devices.

The embodiments of the present specification are described in a progressive way. For same or similar parts of the embodiments, mutual references can be made to the embodiments. Each embodiment focuses on a difference from other embodiments. Particularly, a system embodiment is similar to a method embodiment, and therefore is described briefly. For related parts, references can be made to related descriptions in the method embodiment.

The above descriptions are merely embodiments of the present specification and are not intended for limiting the present specification. For persons skilled in the art, the present specification can be subject to various modifications and variations. Any modifications, equivalent replacements, and improvements made within the spirit and principle of the present specification shall fall within the scope of the claims in the present specification.

What is claimed is:

1. A data processing method applied to a graph database, the method comprising:
   determining, by the graph database, each to-be-queried object in a received query statement and a screening condition for each to-be-queried object based on the query statement, wherein the to-be-queried object comprises at least one of a graph data vertex or a graph data edge in the graph database;
   generating, by the graph database, a target node corresponding to each to-be-queried object, performing semantic analysis on the screening condition for the to-be-queried object, determining a semantic query condition, and determining a sub-node of the target node based on each determined semantic query condition;
   determining, by the graph database, based on the sub-node of the target node corresponding to each to-be-queried object, each database operation corresponding to the target node that needs to be performed by the graph database; and
   executing, by the graph database, a data processing task corresponding to the query statement based on each database operation, and returning an execution result based on the query statement.

2. The method according to claim 1, wherein determining each to-be-queried object in the received query statement and the screening condition for each to-be-queried object based on the query statement comprises:
   receiving the query statement, and determining syntax information corresponding to the query statement;
   determining each to-be-queried object in the query statement and description information of each to-be-queried object based on the syntax information; and
   determining the screening condition for each to-be-queried object based on the description information of the to-be-queried object.

3. The method according to claim 1, wherein the to-be-queried object comprises at least a graph data vertex, and the graph data vertex comprises at least one of a graph data start point or a graph data end point; and
   performing the semantic analysis on the screening condition for the to-be-queried object, determining the semantic query condition, and determining the sub-node of the target node based on each determined semantic query condition comprises:
   performing semantic analysis on a screening condition for the graph data vertex to determine at least one of a name, a type, or a description of the to-be-queried object; and
   determining at least one of a name node, a type node, or a description node in the graph database as the sub-node of the target node corresponding to the to-be-queried object based on the at least one of the name, the type, or the description of the to-be-queried object.

4. The method according to claim 1, wherein the to-be-queried object comprises at least a graph data edge; and
   performing the semantic analysis on the screening condition for the to-be-queried object, determining the semantic query condition, and determining the sub-node of the target node based on each determined semantic query condition comprises:
   performing semantic analysis on a screening condition for the graph data edge to determine at least one of a name, a type, a direction, or a description of the to-be-queried object; and
   determining at least one of a name node, a type node, a direction node, or a description node as the sub-node of the target node corresponding to the to-be-queried object based on the at least one of the name, the type, the direction, or the description of the to-be-queried object.

5. The method according to claim 1, wherein the query statement further comprises a screening condition for a query result; and the method further comprises:
   determining the screening condition for the query result from the query statement;
   determining a target node corresponding to the query result, performing semantic analysis on the screening condition for the query result to obtain a semantic query condition corresponding to the query result, and determining a result constraint node as a sub-node of the target node corresponding to the query result based on the determined semantic query condition; and
   updating, based on the target node corresponding to the query result and the result constraint node, each database operation that needs to be performed by the graph database.

6. The method according to claim 1, wherein the graph database stores a vertex table and a relationship table, the vertex table stores property information of each graph data vertex, and the relationship table stores property information of each graph data edge; and the method further comprises:
    determining, from the vertex table and the relationship table based on the target node corresponding to each to-be-queried object, a target table that needs to be queried for the to-be-queried object; and
    determining, based on each sub-node corresponding to the target node, a database operation performed on the target table.

7. The method according to claim 1, wherein the query statement comprises a screening condition for a query result, and the screening condition for the query result comprises a first screening condition to indicate whether the query result can be empty; and
    returning the execution result based on the query statement comprises:
    determining the screening condition for the query result in the query statement;
    determining whether the execution result matches the first screening condition in the screening condition for the query result;
    if it is determined that the execution result matches the first screening condition, returning the execution result; and
    if it is determined that the execution result does not match the first screening condition, returning prompt information to indicate that execution of the query statement fails.

8. An electronic device, comprising:
    a processor; and
    a memory storing instructions executable by the processor,
    wherein the processor is configured to:
    determine each to-be-queried object in a received query statement and a screening condition for each to-be-queried object based on the query statement, wherein the to-be-queried object comprises at least one of a graph data vertex or a graph data edge in a graph database;
    generate a target node corresponding to each to-be-queried object, perform semantic analysis on the screening condition for the to-be-queried object, determine a semantic query condition, and determine a sub-node of the target node based on each determined semantic query condition;
    determine, based on the sub-node of the target node corresponding to each to-be-queried object, each database operation corresponding to the target node that needs to be performed by the graph database; and
    execute a data processing task corresponding to the query statement based on each database operation, and return an execution result based on the query statement.

9. The electronic device according to claim 8, wherein the processor is further configured to:
    receive the query statement, and determine syntax information corresponding to the query statement;
    determine each to-be-queried object in the query statement and description information of each to-be-queried object based on the syntax information; and
    determine the screening condition for each to-be-queried object based on the description information of the to-be-queried object.

10. The electronic device according to claim 8, wherein the to-be-queried object comprises at least a graph data vertex, and the graph data vertex comprises at least one of a graph data start point or a graph data end point; and
    the processor is further configured to:
    perform semantic analysis on a screening condition for the graph data vertex to determine at least one of a name, a type, or a description of the to-be-queried object; and
    determine at least one of a name node, a type node, or a description node in the graph database as the sub-node of the target node corresponding to the to-be-queried object based on the at least one of the name, the type, or the description of the to-be-queried object.

11. The electronic device according to claim 8, wherein the to-be-queried object comprises at least a graph data edge; and
    the processor is further configured to:
    perform semantic analysis on a screening condition for the graph data edge to determine at least one of a name, a type, a direction, or a description of the to-be-queried object; and
    determining at least one of a name node, a type node, a direction node, or a description node in the graph database as the sub-node of the target node corresponding to the to-be-queried object based on the at least one of the name, the type, the direction, or the description of the to-be-queried object.

12. The electronic device according to claim 8, wherein the query statement further comprises a screening condition for a query result; and the processor is further configured to:
    determine the screening condition for the query result from the query statement;
    determine a target node corresponding to the query result, perform semantic analysis on the screening condition for the query result to obtain a semantic query condition corresponding to the query result, and determine a result constraint node as a sub-node of the target node corresponding to the query result based on the determined semantic query condition; and
    update, based on the target node corresponding to the query result and the result constraint node, each database operation that needs to be performed by the graph database.

13. The electronic device according to claim 8, wherein the graph database stores a vertex table and a relationship table, the vertex table stores property information of each graph data vertex, and the relationship table stores property information of each graph data edge; and
    the processor is further configured to:
    determine, from the vertex table and the relationship table based on the target node corresponding to each to-be-queried object, a target table that needs to be queried for the to-be-queried object; and
    determine, based on each sub-node corresponding to the target node, a database operation performed on the target table.

14. The electronic device according to claim 8, wherein the query statement comprises a screening condition for a query result, and the screening condition for the query result comprises a first screening condition to indicate whether the query result can be empty; and
    the processor is further configured to:
    determine the screening condition for the query result in the query statement;
    determine whether the execution result matches the first screening condition in the screening condition for the query result;
    if it is determined that the execution result matches the first screening condition, return the execution result; and if it is determined that the execution result does not match the first screening condition, return prompt information to indicate that execution of the query statement fails.

15. A non-transitory computer-readable storage medium having stored thereon instructions that, when executed by a processor, cause the processor to perform a data processing method applied to a graph database, the method comprising:
determining each to-be-queried object in a received query statement and a screening condition for each to-be-queried object based on the query statement, wherein the to-be-queried object comprises at least one of a graph data vertex or a graph data edge in the graph database;
generating a target node corresponding to each to-be-queried object, performing semantic analysis on the screening condition for the to-be-queried object, determining a semantic query condition, and determining a sub-node of the target node based on each determined semantic query condition;
determining, based on the sub-node of the target node corresponding to each to-be-queried object, each database operation corresponding to the target node that needs to be performed by the graph database; and
executing a data processing task corresponding to the query statement based on each database operation, and returning an execution result based on the query statement.

16. The non-transitory computer-readable storage medium according to claim 15, wherein determining each to-be-queried object in the received query statement and the screening condition for each to-be-queried object based on the query statement comprises:
receiving the query statement, and determining syntax information corresponding to the query statement;
determining each to-be-queried object in the query statement and description information of each to-be-queried object based on the syntax information; and
determining the screening condition for each to-be-queried object based on the description information of the to-be-queried object.

17. The non-transitory computer-readable storage medium according to claim 15, wherein the to-be-queried object comprises at least a graph data vertex, and the graph data vertex comprises at least one of a graph data start point or a graph data end point; and
performing the semantic analysis on the screening condition for the to-be-queried object, determining the semantic query condition, and determining the sub-node of the target node based on each determined semantic query condition comprises:
performing semantic analysis on a screening condition for the graph data vertex to determine at least one of a name, a type, or a description of the to-be-queried object; and
determining at least one of a name node, a type node, or a description node in the graph database as the sub-node of the target node corresponding to the to-be-queried object based on the at least one of the name, the type, or the description of the to-be-queried object.

18. The non-transitory computer-readable storage medium according to claim 15, wherein the to-be-queried object comprises at least a graph data edge; and
performing the semantic analysis on the screening condition for the to-be-queried object, determining the semantic query condition, and determining the sub-node of the target node based on each determined semantic query condition comprises:
performing semantic analysis on a screening condition for the graph data edge to determine at least one of a name, a type, a direction, or a description of the to-be-queried object; and
determining at least one of a name node, a type node, a direction node, or a description node as the sub-node of the target node corresponding to the to-be-queried object based on the at least one of the name, the type, the direction, or the description of the to-be-queried object.

19. The non-transitory computer-readable storage medium according to claim 15, wherein the query statement further comprises a screening condition for a query result; and the method further comprises:
determining the screening condition for the query result from the query statement;
determining a target node corresponding to the query result, performing semantic analysis on the screening condition for the query result to obtain a semantic query condition corresponding to the query result, and determining a result constraint node as a sub-node of the target node corresponding to the query result based on the determined semantic query condition; and
updating, based on the target node corresponding to the query result and the result constraint node, each database operation that needs to be performed by the graph database.

20. The non-transitory computer-readable storage medium according to claim 15, wherein the graph database stores a vertex table and a relationship table, the vertex table stores property information of each graph data vertex, and the relationship table stores property information of each graph data edge; and
the method further comprises:
determining, from the vertex table and the relationship table based on the target node corresponding to each to-be-queried object, a target table that needs to be queried for the to-be-queried object; and
determining, based on each sub-node corresponding to the target node, a database operation performed on the target table.

* * * * *